(12) United States Patent
Tammisetti

(10) Patent No.: US 8,219,079 B2
(45) Date of Patent: Jul. 10, 2012

(54) SYSTEM AND METHOD FOR MICROWAVE TRAFFIC ROUTING

(75) Inventor: Mohan Tammisetti, South Riding, VA (US)

(73) Assignee: Clear Wireless LLC, Kirkland, WA (US)

( * ) Notice: Subject to any disclaimer, the term of this patent is extended or adjusted under 35 U.S.C. 154(b) by 331 days.

(21) Appl. No.: 12/510,896

(22) Filed: Jul. 28, 2009

(65) Prior Publication Data

US 2011/0028146 A1    Feb. 3, 2011

(51) Int. Cl.
*H04W 4/00*    (2009.01)
(52) U.S. Cl. .............. 455/426.1; 455/445; 455/561
(58) Field of Classification Search ......... 455/436.1, 455/445, 561, 426.1
See application file for complete search history.

(56) References Cited

U.S. PATENT DOCUMENTS

| | | | |
|---|---|---|---|
| 2006/0140121 A1* | 6/2006 | Kakani et al. | 370/235 |
| 2007/0230427 A1* | 10/2007 | Arseneault et al. | 370/340 |
| 2008/0112343 A1* | 5/2008 | Oleszczuk | 370/310 |

* cited by examiner

*Primary Examiner* — Barry Taylor
(74) *Attorney, Agent, or Firm* — Michael J. Donohue; Davis Wright Tremaine LLP

(57) ABSTRACT

A radio communication system has a primary communication pathway and a secondary communication pathway. When the primary communication pathway is implemented by a microwave radio link, it is susceptible to poor performance under adverse weather conditions. A system evaluates the available data bandwidth under adverse conditions and provides control instructions to a data switch to reduce the data flow to the primary communication pathway. In addition, the data switch may receive priority control data to prioritize data queues to the primary communication pathway and the secondary communication pathway in accordance with the received instructions.

30 Claims, 7 Drawing Sheets

SYSTEM AND METHOD FOR MICROWAVE TRAFFIC ROUTING

BACKGROUND OF THE INVENTION

1. Field of the Invention

The present invention is directed generally to a communication system and, more particularly, to a system and method for routing traffic in a communication system having a microwave link.

2. Description of the Related Art

Wireless communication systems have become commonplace. A conventional wireless communication system comprises a number of distributed access points, such as base stations. Subscribers communicate bi-directionally with the base stations. The data at the distributed access points must be delivered to a centralized point-of-presence, such as a mobile switching center (MSC). The communication links between the distributed access points (e.g., the base stations) and the centralized access point (e.g., the MSC) is referred to as a backhaul.

The backhaul communication pathway may be implemented using a variety of known technologies. For example, the base station may be coupled to the MSC using a wire or optical fiber. Microwave communication links are also used to implement the backhaul. Many communication systems will provide multiple different communication pathways to implement the backhaul. For example, a base station may be coupled to the MSC using a microwave link and a copper wire.

An advantage of a microwave backhaul link is that it does not require a physical connection between the base station and the MSC. Furthermore, microwave communication links are well-known and readily available in the commercial marketplace. A disadvantage of a microwave link is that it is susceptible to the effects of adverse weather. For example, the water droplets in rain cause a significant adverse impact on the microwave link. Thus, bad weather essentially reduces the available data bandwidth on a microwave link.

In a system with multiple backhaul links, a data switch couples the distributed access point (e.g., the base station) with the MSC. Such data switches are commercially available and include queuing algorithms to maintain priority in communications across the backhaul link.

Unfortunately, the conventional data switch has no information regarding the available data bandwidth in a microwave link nor does the switch have any information regarding the quality of the microwave link. When adverse weather decreases the available data bandwidth in the microwave link or adversely affects the quality of the microwave link, the switch detects problems in a communication link, such as a detection of transmission errors and the requirement for retransmission of data, and simply shuts down the microwave link and transfers all traffic to a secondary backhaul link regardless of bandwidth availability on the microwave backhaul link. Therefore, it can be appreciated that there is a significant need for a system and method that maintains operation of a microwave link even in the face of adverse weather. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

Wireless communication systems have evolved from simple cell sites with limited coverage area for voice communication to complex networks with extensive coverage and high speed broadband communication capabilities for voice, data, video, and the like. As the wireless communication networks continue to evolve, more sophisticated forms of communication are required.

The present disclosure is directed to techniques for apportioning data among a primary and a secondary data pathway. As discussed above, a conventional data switch transmits data on either a primary pathway or a secondary pathway. If the primary pathway is implemented by a microwave communication link, there is a potential for a degradation of signal quality and a reduction in bandwidth in adverse weather conditions. The conventional switch receives error data and detects an increase in errors for data being transmitted via the primary pathway. The conventional switch responds by terminating all communication to the primary pathway and switching data to the secondary pathway.

In contrast, the present disclosure describes techniques by which a microwave radio can communicate control information to a data switch to indicate that, while bandwidth is reduced as a result of adverse weather conditions, there is still some bandwidth available for transmission of data on the primary pathway. Thus, the data switch may re-apportion data flow between the primary and secondary pathways, but will not totally shut down the primary pathway as is done in conventional switches.

Figure 1:
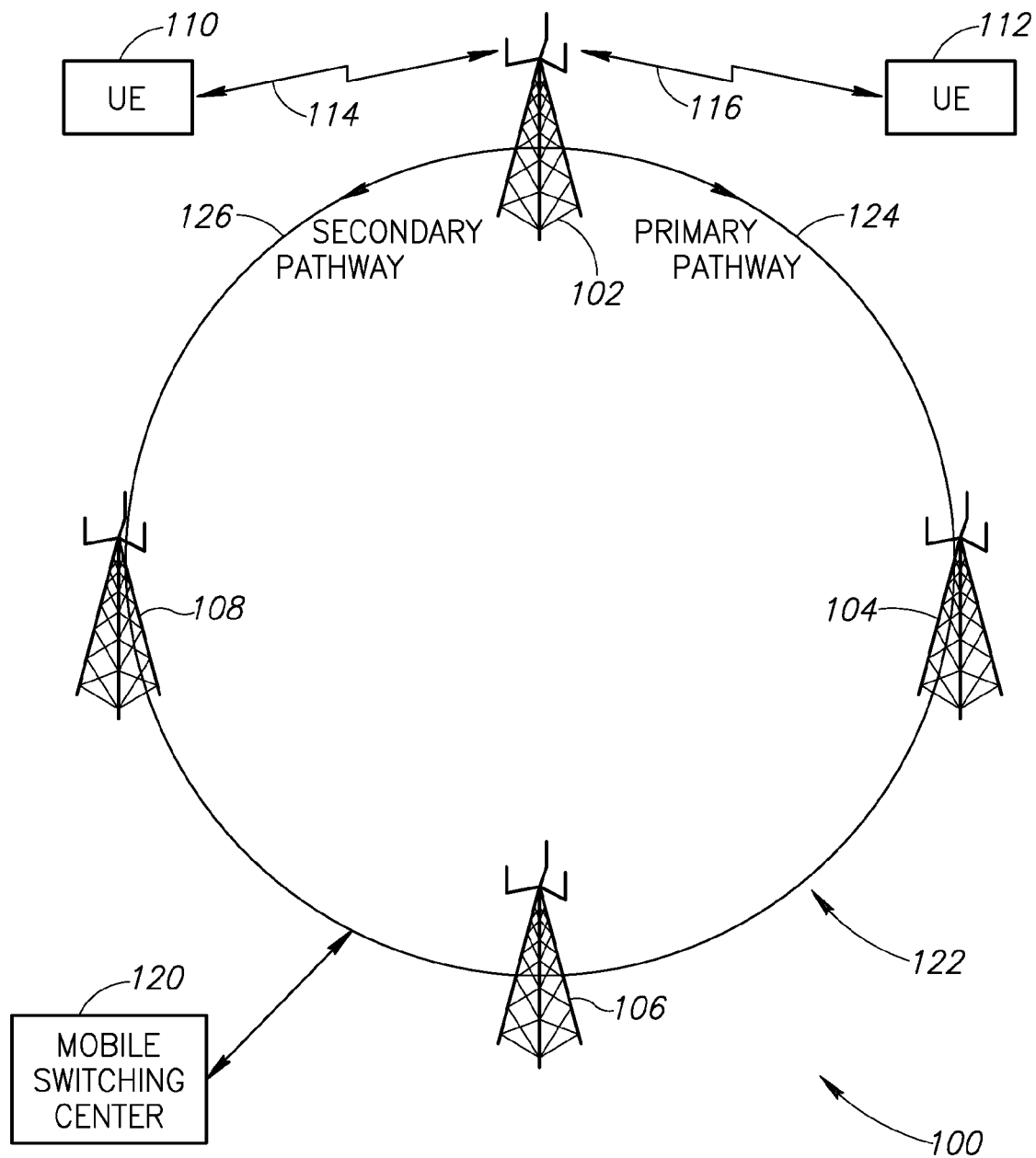
FIG. 1 illustrates a ring architecture commonly used in wireless communication systems.

The techniques described herein may be implemented as a system 100, illustrated in an example embodiment in FIG. 1. FIG. 1 illustrates base stations 102-108. The base station 102 is coupled to user equipment (UE) 110-112 via wireless communication links 114-116, respectively. Those skilled in the art will appreciate that the UE 110-112 are representative of a broad variety of wireless devices that may communicate with the base station 102. For example, the UE 110-112 could be conventional analog cell phones, such as advance mobile phone system (AMPS) devices, personal communication system (PCS) devices, personal digital assistant (PDA) devices, voice over internet protocol (VoIP) devices, personal computers (PC), or the like. The use of these various communication devices in a wireless setting is well known and need not be described in greater detail herein. Those skilled in the art will appreciate that the base stations illustrated in FIG. 1 would typically have many UEs coupled to each base station. However, for the sake of clarity, FIG. 1 illustrates only four base stations (i.e., the base stations 102-108) and only two UE (i.e., the UE 110-112) coupled to a single base station.

The present disclosure is directed to communication between the base stations 102-108 and a central point-of-presence. In the system 100 illustrated in FIG. 1, a mobile switching office or mobile switching center (MSC) 120 receives communication from the various base stations using communication links commonly referred to as a backhaul. The present disclosure is directed to the backhaul communication rather than the communication links 114-116 with the UE 110-112, respectively. Accordingly, those skilled in the art will appreciate that the UE 110-112 may be implemented using any known form of wireless communication and multiple access protocols. For example, the UE 110-112 could be implemented using GSM, CDMA, 3G, 4G, WiMax, and the like. Each of these various communication protocols are known in the art and need not be described in greater detail herein. In addition, each of these communication protocols may use various techniques for multiple user access. For example, the UE 110-112 may utilize time-division multiple access (TDMA), frequency division multiple access (FDMA), orthogonal frequency division multiple access (OFDMA) or the like. The present disclosure is applicable to any form of UE and equally applicable to any communication protocol and any multiple access technique to provide the communication links 114-116 between the base station 102 and the UE 110-112, respectively. Accordingly, the system 100 is not limited to any specific communication process between the base station 102 and the UE 110-112.

In the illustration of FIG. 1, the system 100 is implemented in a ring architecture 122 in which some base stations communicate with the MSC 120 via other base stations in the same ring. For clarity, the ring architecture 122 illustrated in FIG. 1 includes only the four base stations 102-108. Those skilled in the art will appreciate that a ring architecture can include greater or fewer than the four base stations 102-108. For example, the ring architecture may include only three base stations or may include 20-30 base stations. The specific example illustrated in FIG. 1 is an exemplary embodiment to illustrate communications via multiple pathways. In the ring 122 illustrated in FIG. 1, MSC 120 is coupled to the ring between the base stations 106-108. Thus, the base stations 106-108 may communicate directly with the MSC 120 via their respective communication links.

The base stations 102-104 must communicate with the MSC 120 via either the base station 106 or the base station 108. The base station 102 can communicate with the MSC 120 via a primary communication pathway 124 or a secondary communication pathway 126. As illustrated in FIG. 1, the primary pathway 124 allows communication between the base station 102 and the MSC 120 via the base station 104 and the base station 106. The secondary pathway 126 allows communication between the base station 102 and the MSC 120 via the base station 108. The present disclosure is directed to methods for microwave traffic routing and, therefore, is broadly applicable to a microwave communication link. The following discussion will focus on the base station 102 and the primary pathway 124, and the secondary pathway 126. For purposes of the present discussion, it will be assumed that the primary pathway 124 is implemented as a microwave communication link.

Figure 2:
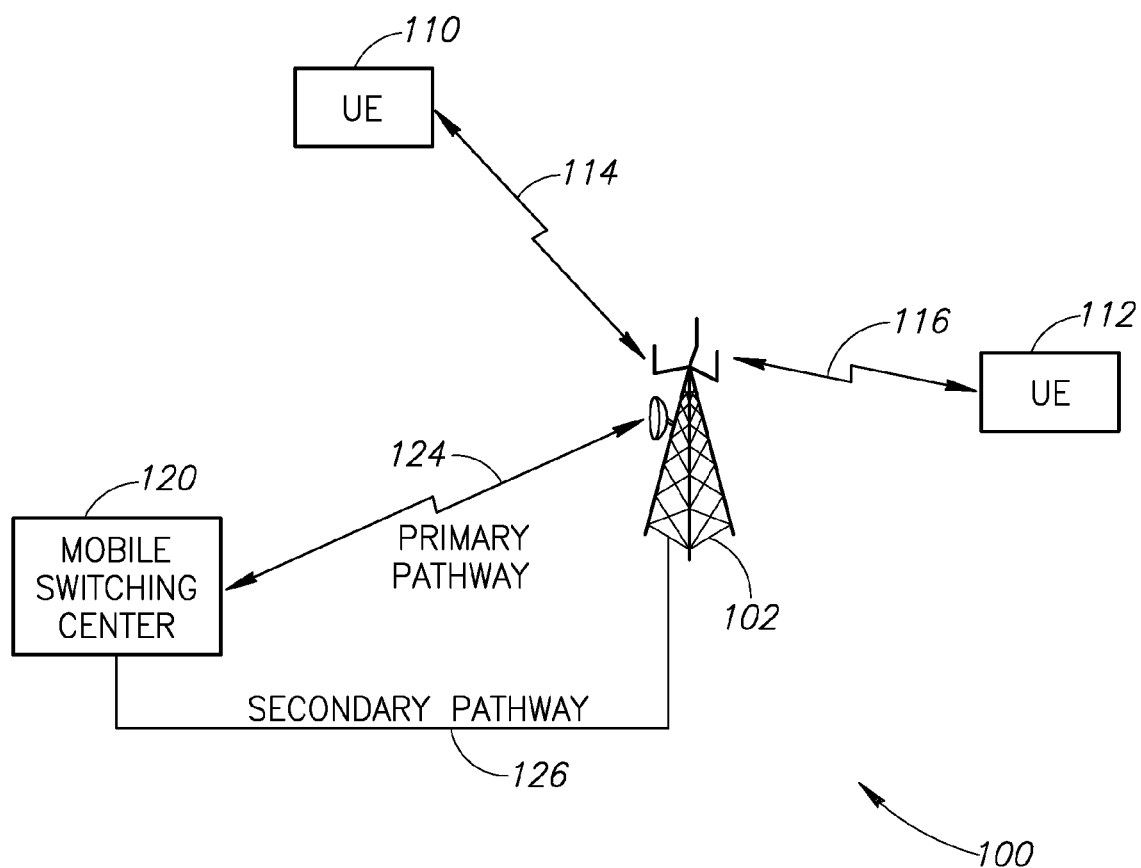
FIG. 2 illustrates an alternative architecture constructed in accordance with the present teachings.

While the ring architecture 122 illustrated in FIG. 1 provides alternate communication pathways for each base station, the techniques of the present disclosure do not require such an architecture. For example, FIG. 2 illustrates the base station 102 and the MSC 120 in a different architecture. In the architecture of FIG. 2, the primary pathway 124 and the secondary pathway 126 both couple the base station 102 directly with the MSC 120. In the example of FIG. 2, the primary pathway 124 is implemented as a microwave communication link. The secondary pathway 126 may be implemented with a hard wire, fiberoptic link, wireless link (e.g., a microwave link or other radio frequency link), or the like. Thus, the system 100 is not limited only to the ring architecture 122 of FIG. 1.

Figure 3:
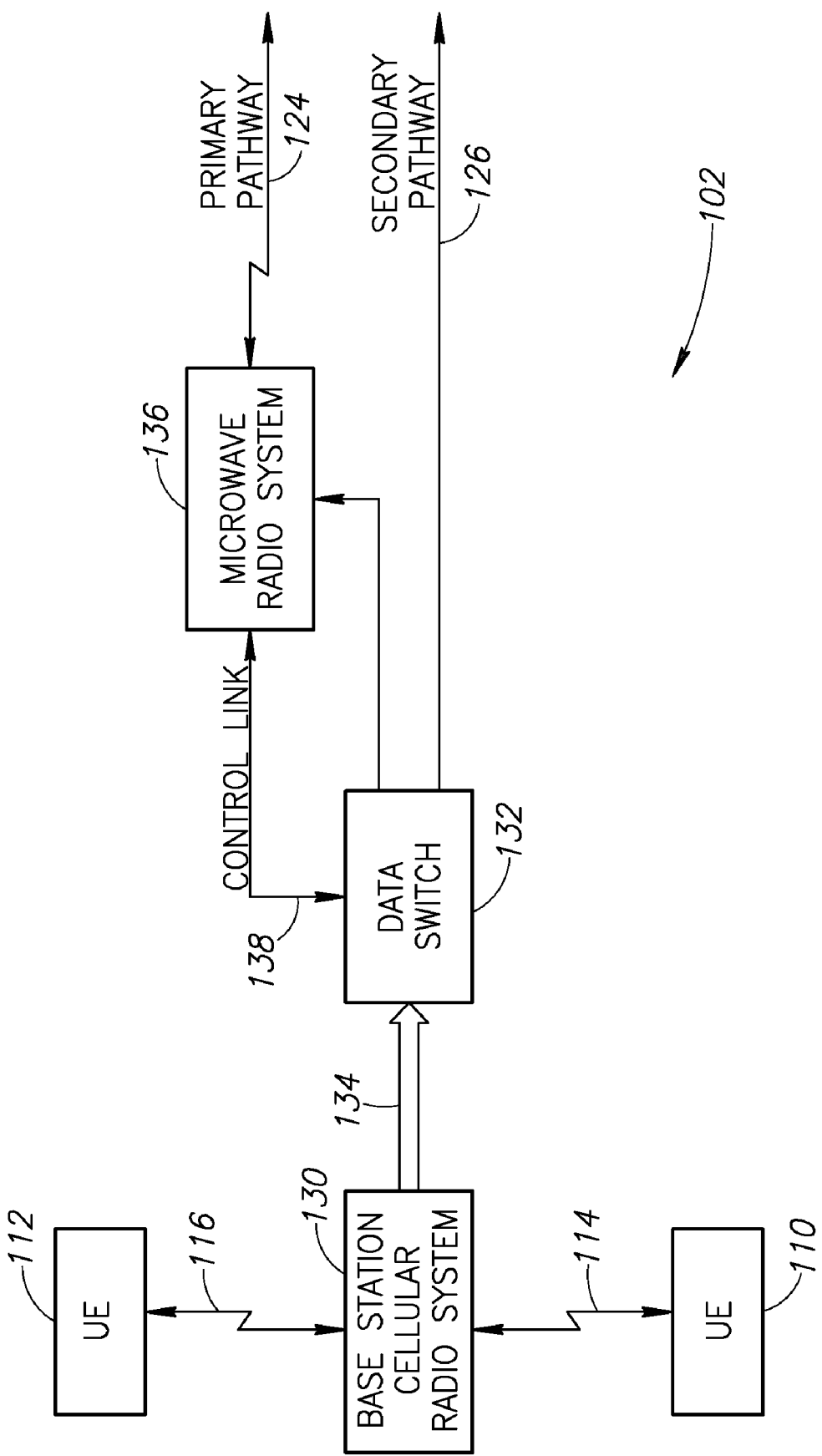
FIG. 3 is a functional block diagram of a base station in FIG. 1.

FIG. 3 is a functional block diagram of the base station 102 and illustrates the UE 110-112. The base station 102 includes a base station cellular radio system 130 that establishes and maintains the communication links 114-116 with the UE 110-112, respectively. The base station cellular radio system 130 typically includes one or more transmitter/receiver pairs, which may be implemented as transceivers as well as associated amplifiers and antenna. In many implementations, the base station 102 may have multiple sectors of geographic coverage wherein each sector has a transmitter/receiver pair and antenna. For example, it is common for a base station to have three coverage sectors. The base station has a separate antenna for each coverage sector as well as a different radio transmitter/receiver pair for each sector. In some implementations, each radio transmitter/receiver pair operators at a different frequency. This depends on the specific communication protocol being implemented by the base station cellular radio system 130. Those skilled in the art will appreciate that other variations, such as greater or fewer sectors, different radio frequency assignment patterns, different communication protocols, different multiple user access protocols and the like are all possible depending on the specific implementation of the base station cellular radio system 130.

The base station cellular radio system 130 is coupled to a data switch 132 via a data link 134. The data switch 132 is a commercial device available from a number of a different manufacturers. In a typical implementation, the data switch 132 organizes data received the data link 134 into a number a different queues based on the priority of a particular traffic flow. The operation of queuing algorithms and flow control by the data switch 132 is known in the art and will be described herein only as it relates to operational control of the data switch.

In a typical communication system, a base station controller (not shown) or similar network element controls operation of the base station 102, including control of the base station cellular radio system. The base station 102 (and/or the base station controller) exchange network control information with the MSC 120. Network control information is considered to be the highest priority communication since the entire system may fail in the event of a failure to transmit and/or receive this high priority data. This network control information is considered to be the highest priority communications that occurs in the system 100 and is thus given top priority for processing and transmission. Other forms of data, such as VoIP, video data, and the like are time-sensitive and jitter-sensitive and receive high priorities based on a particular quality of service (QoS) provided to a particular customer. Other communication traffic, such as web surfing, email, and the like are less time-sensitive. This type of traffic is often designated as "Best Efforts" traffic, meaning that the system 100 will route this type of data with its best possible efforts, but does not provide any guarantee such as may be provided with higher QoS traffic.

In addition to queuing algorithms implemented by the data switch 132, the data switch has routing algorithms to control outgoing data and direct it to the primary pathway 124 or the secondary pathway 126. As discussed above, a conventional switch routes all data on the backhaul link implemented by the microwave unless a problem is detected with microwave transmission. In the event of adverse weather, the data bandwidth available via the microwave link is reduced. In addition, the quality of the signal may also be reduced. The conventional data switch interprets these problems as a failure of the primary pathway and automatically switches to the secondary pathway irrespective of any available bandwidth that may still be provided by the primary pathway.

In contrast, elements of the base station 102 detect the reduced data bandwidth available on the primary pathway 126 and sends a control message to the data switch 132 indicating the available bandwidth on the primary pathway. The data switch 132 limits the data flow to the primary pathway 124 to meet the new constraints imposed by the limited data bandwidth. At the same time, traffic flow may be increased to the secondary pathway 126 while data flow is still maintained, at some level, to the primary pathway 124. Thus, the data switch 132 advantageously maintains some data flow to the primary pathway 124 and provides better overall utilization of communication capabilities within the system 100 than would be possible if the data switch simply cut off all communication to the primary pathway as is done in conventional data switches. Operational details of the base station 102 are provided below.

As described above with respect to FIG. 3, the primary pathway 124 is implemented using a microwave communication link. While the secondary pathway 126 may be implemented as a hard wire cable link, fiberoptic link, wireless link (e.g., a microwave link or other radio frequency link) or a combination of the above. The microwave communication on the primary pathway 124 is implemented using a microwave radio system 136. As will be described in greater detail below, the microwave radio system 136 communicates control information to the data switch 132 via a control link 138. The control link 138 provides data bandwidth and other information to the data switch 132 that allows the data switch to reduce data flow to the primary pathway if necessary, but does not cause the data switch to completely shut down the primary pathway 124. The control link 138 also carries information regarding the priority of data to be transmitted on the primary pathway 124. This is especially important under adverse weather conditions where the primary pathway may have sufficient bandwidth to handle a certain type of data flow, but the information on the control link 138 instructs the data switch 132 to transfer communication traffic to the secondary pathway on the basis of traffic priority. This prioritization will also be discussed in greater detail below.

Figure 4:
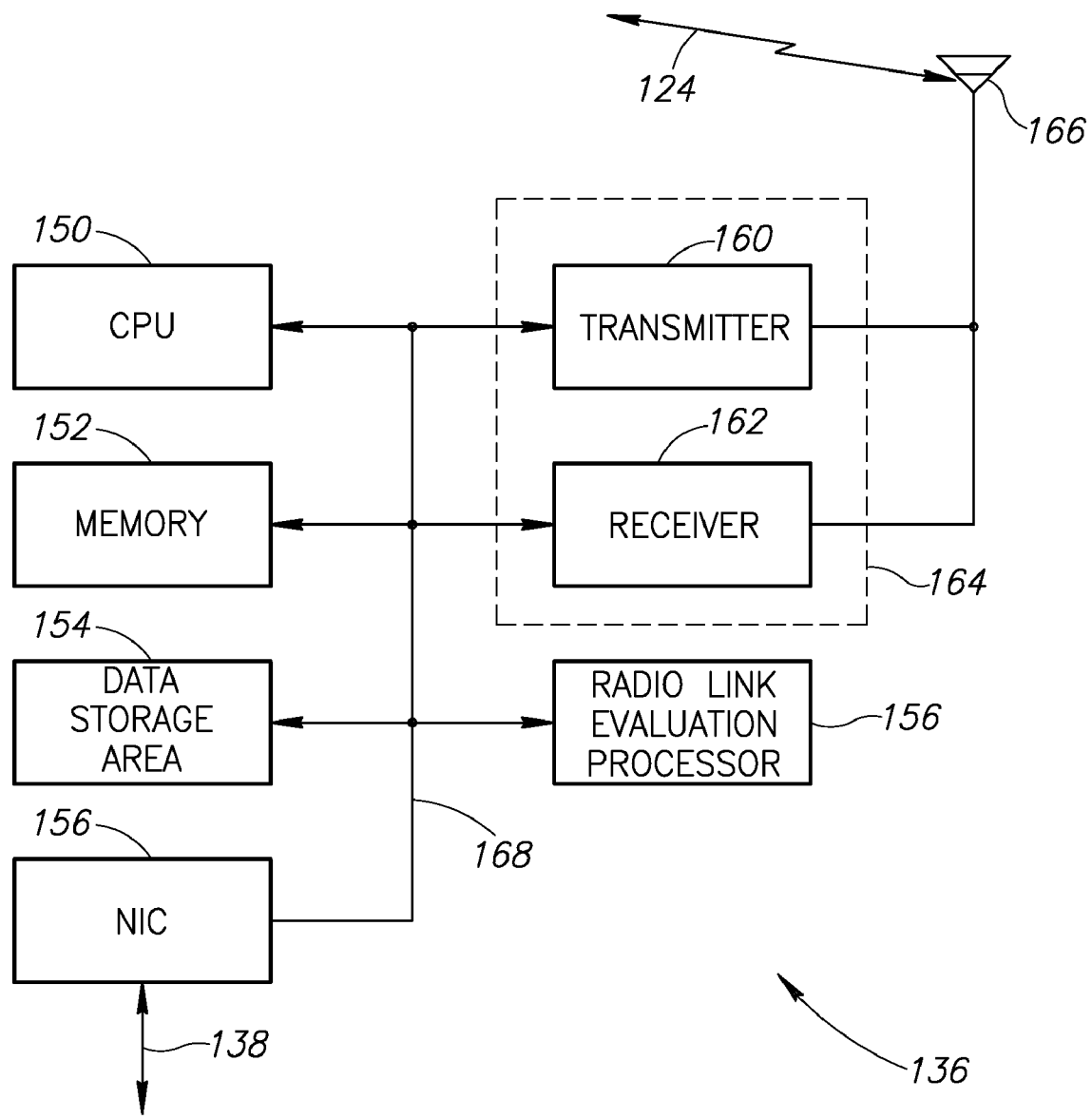
FIG. 4 is a functional block diagram of a microwave radio portion of the base station of FIG. 3.

FIG. 4 illustrates a functional block diagram of the microwave radio system 136. The microwave radio system 136 includes a central processing unit 150 (CPU) and a memory 152. The CPU 150 may be implemented as a conventional microprocessor, a digital signal processor, microcontroller, programmable-gate array, discrete circuitry, or the like. The microwave radio system 136 is not limited by the particular form of circuitry used to implement the CPU 150.

Similarly, the memory 152 may be implemented as random access memory, read-only memory, programmable memory, flash memory, a combination of one or more of the above types of memory, or other similar data storage devices. In one embodiment, a portion of the memory 152 may be integrated into the CPU 150. Thus, the microwave radio system 136 is not limited by the particular form of circuitry used to implement the memory 152. In general, the memory 152 contains instructions and data that are executed by the CPU 150.

The microwave radio system 136 may also include a data storage area 154, such as a disk drive or the like. In one embodiment, the data storage area 154 may be part of the memory 152. In one embodiment, the data storage area 154 may serve as a buffer for data awaiting transmission via the primary pathway 124.

FIG. 4 also illustrates a network interface controller (NIC) 156. The NIC 156 may be a conventional communication interface, such as an Ethernet interface, IEEE 1394 interface, USB interface, or the like. The microwave radio system 136 is not limited by the specific form of the NIC 156. The NIC 156 is coupled to the control link 138 to thereby establish communication between the microwave radio system 136 and the data switch 132.

FIG. 4 also illustrates a radio link evaluation processor 158. As will be discussed in greater detail below, the radio link evaluation processor 158 collects data and evaluates the available data bandwidth and the quality of the primary pathway 124. This information forms the basis of communication between the microwave radio system 136 and the data switch 132 that will allow some data to flow through the primary pathway 124 even under most adverse weather conditions.

FIG. 4 also illustrates a microwave transmitter 160 and a microwave receiver 162. In some implementations, the transmitter 160 and receiver 162 may share components and be implemented as a microwave transceiver 164. The transceiver 164 is coupled to an antenna 166. The antenna 166 may be implemented as a parabolic dish to provide greater signal gain and directivity. In addition, the operational frequencies of the transmitter 160 and receiver 162 may be controlled in accordance with conventional standards for microwave communication. Those skilled in the art will appreciate that the microwave radio system 136 typically communicates via line-of-sight. The primary pathway 124 may include one or more microwave repeaters (not shown) if line-of-sight communication is not available between the base station 102 and the base station 104 (see FIG. 1). The microwave transceiver 164 and antenna 166 are commercial devices whose operation is well understood. Accordingly, the operation of the microwave transceiver 164 and antenna 166 need not be described in greater detail herein.

The various components described above area coupled together by a bus system 168, which may include a data bus, address bus, power bus, control bus, and the like. For the sake of clarity, those various buses are illustrated herein as the bus system 168.

Those skilled in the art will appreciate that some elements illustrated in the functional block diagram of FIG. 4 may be implemented as a series of instructions stored in the memory 152 and executed by the CPU 150. For example, the radio link evaluation processor 158 may be implemented as a series of instructions and data stored in the memory 152 and executed by the CPU 150. This element is illustrated as a separate block in the functional block diagram of FIG. 4 because it performs a separate function.

In normal operation, the microwave radio system 136 typically has 50 megahertz (MHz) of radio frequency (RF) bandwidth and can provide a data bandwidth or data delivery rate of at least 200 megabits per second (Mbps). However, this is subject to weather conditions. The microwave radio system 136 communicates using quadrature amplitude modulation (QAM). In good weather, a complex QAM modulation may be used to provide greater data throughput for a given RF bandwidth. For example, in good weather conditions, the microwave radio system will use 256 QAM modulation to provide a data delivery rate of at least 200 Mbps. That is, the complex modulation provided by 256 QAM allows more data bits per unit of RF bandwidth than other forms of modulation. As weather conditions deteriorate, the microwave radio system 136 will reduce the modulation rate to provide more robust transmission with greater error recovery capability.

When adverse weather conditions are present, it is not the RF bandwidth (e.g., 50 MHz) that is reduced, but the data bandwidth or delivery rate. This process, known as adaptive modulation, allows the microwave radio system 136 to use a complex modulation scheme when conditions are good to deliver the maximum data rate. Under adverse conditions, lower modulation forms (e.g., 128 QAM) may be used that provide a more robust signal, with greater error detection/correction, but at a lower data bandwidth. Those skilled in the art will appreciate that these lower forms of modulation require greater RF bandwidth per data bit resulting in a lower data delivery rate. Under more adverse weather conditions, the adaptive modulation rate may be reduced to a lower form of modulation referred to as quadrature phase shift keying (QPSK). Operation of the microwave radio system 136 using QPSK may result in a data bandwidth as low as 10 Mbps even though the microwave radio system still operates at a 50 MHz RF bandwidth.

Other measurements may also be derived by the system 100 to measure the quality of the primary pathway 124. In the ring architecture 122 illustrated in FIG. 1, the primary pathway 124 of the base station 102 provides a communication link with the base station 104. If this primary pathway 124 is implemented by a microwave link, (i.e., the microwave radio system 136 of FIG. 4), a microwave radio system (not shown) associated with the base station 104 transmits certain data to the base station 102 related to the quality of the signal link provided by the primary pathway 124. The microwave radio system in the base station 104 operates in a manner similar or identical to that of the microwave radio system 136 in the base station 102. The microwave radio system associated with the base station 104 provides a signal to noise (S:N) ratio to the microwave radio system 136. The S:N ratio may be delivered in the form of a bit error rate (BER), as is known in the industry. Under normal operating conditions, the BER may typically be $1 \times 10^{-6}$. This means that approximately one in a million bits is received in error. However, under adverse conditions, the BER may be reduced to $1 \times 10^{-4}$ or $1 \times 10^{-3}$. Thus, the BER provides a measure of the quality of the primary pathway independent of the actual data bandwidth availability.

In addition to the BER, the microwave radio system (not shown) associated with the base station 104 provides a signal strength measurement in the form of a received signal level (RSL) or a received signal strength index (RSSI). Under normal operating conditions, an RSSI of −35 dBm to −70 dBm is typically sufficient for a good quality connection. As the signal level drops below −70 dBm, the receiver may be unable to operate satisfactorily and the error rate (e.g., the BER) may increase as the S:N ratio decreases.

Those skilled in the art will appreciate that the modulation level, the RSSI, and the BER are separate measurements, but are not totally independent. For example, a lower signal level will result in a lower RSSI. A lower RSSI by itself may not result in an increased BER so long as the RSSI is above some minimum threshold. However, if the RSSI falls to an unsatisfactory level, the BER will increase. The microwave radio system 136 utilizes these factors in selecting an adaptive modulation level. For example, operation at a selected amplitude modulation level may be satisfactory until the BER falls below some user-selected threshold. At this threshold, it is considered that the error rate is unacceptable. At that point, the microwave radio system 136 may switch to a lower modulation level. At the lower modulation level, the BER would be expected to rise to a satisfactory level. The conventional data switch has no knowledge of the modulation level selected by the microwave radio system nor does it have any knowledge of the RSSI or BER. The conventional data switch merely knows that data is not being delivered as quickly as it is being sent and the conventional data switch totally cuts data delivery to the primary pathway and delivers all data to the secondary pathway.

In contrast, the radio link evaluation processor 158 analyzes the adaptive modulation level, the BER, and the RSSI to determine an effective data delivery rate and provides instructions, via the control link 138, to the data switch 132. The instructions on the control link 138 include data related to the available data delivery rate, which may be referred to as the data bandwidth, and may further provide queuing instructions indicating which type of data should be delivered to the primary pathway 124 and the secondary pathway 126. The queuing priority will be discussed in greater detail below.

Figure 5:
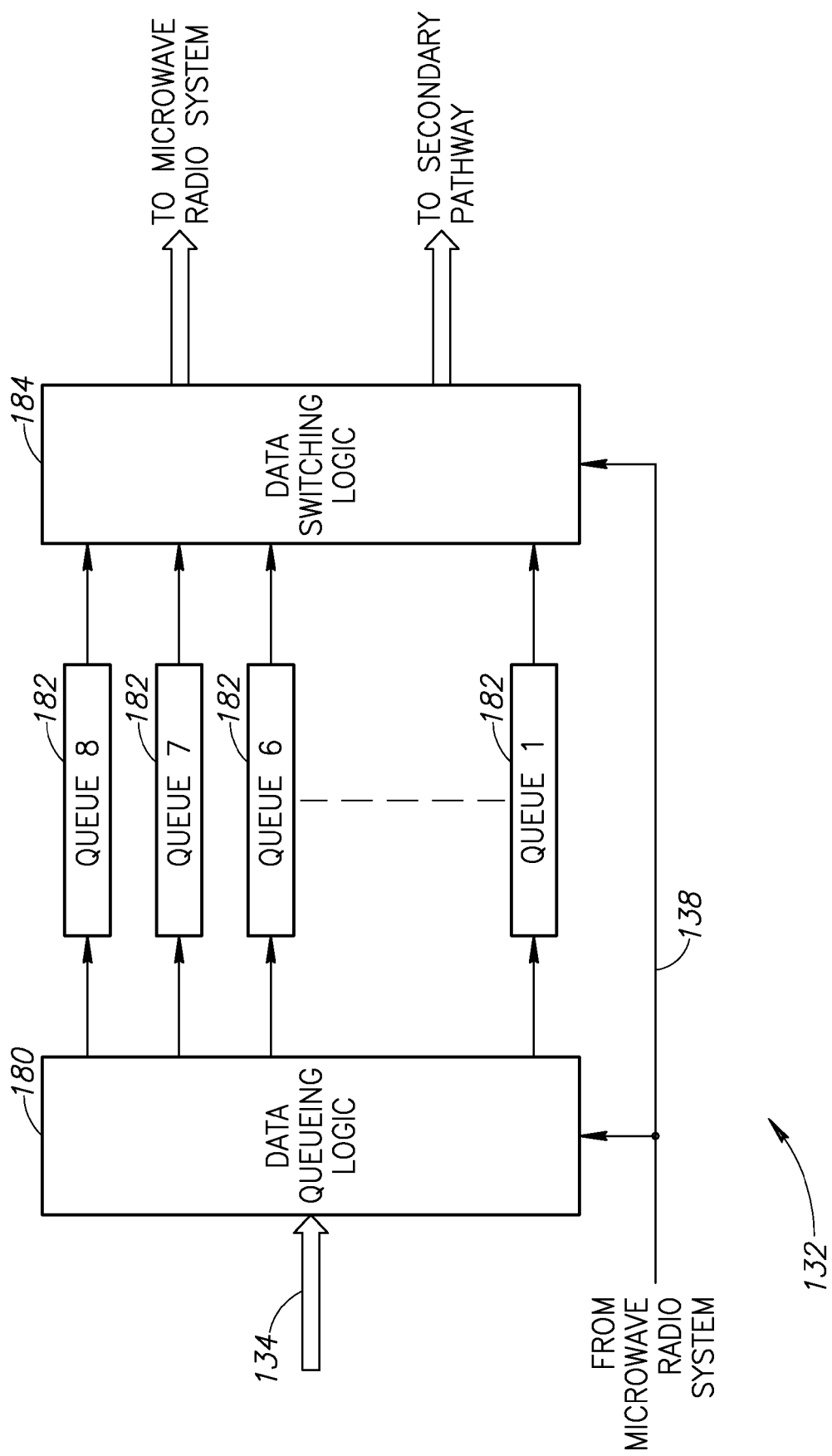
FIG. 5 is a functional block diagram of the data switch of FIG. 3.

FIG. 5 is a functional block diagram of the data switch 132. The data switch 132 contains data queuing logic 180 that receives incoming data and places the incoming data in one of a plurality of queues 182 based on priorities assigned to the incoming data traffic. The data switch 132 illustrated in FIG. 5 contains eight data queues 182. By convention, Queue 8 is designated to handle the highest priority traffic through the data switch 132 while the Queue 1 is designated to carry the lowest priority data traffic in the data switch. As discussed above, the highest priority data traffic is typically network control traffic exchanged between network elements, such as the base stations 102-108 and the MSC 120 and/or a base station controller (not shown). Those skilled in the art will appreciate that no communication network will operate without the exchange of such control/management data. Accordingly, this data is designated as the highest priority data and routed to Queue 8. Other time-sensitive traffic, such as VoIP traffic, video conferencing data and the like is generally designated as high priority traffic based on the quality of service (QoS) level purchased by a subscriber. Other types of data that may be time-sensitive and/or jitter-sensitive, may be classified in high priority queues, such as Queue 6 and Queue 7. Other lower-priority traffic, sometimes designated as Best Effort (BE) traffic is assigned to lower-priority queues, such as Queue 3-Queue 1. The data queuing logic 180 identifies the type of data flow and assigns it to one of the queues 182 based on priority.

The data switch 132 also includes data switching logic 184. The data switching logic 184 is coupled to the output of the queues 182. The data switching logic 184 routes data to the primary pathway 124 and/or the secondary pathway 126. As noted above, a conventional data switch routes all data to the primary pathway, when functional. Under normal operations, all data is routed to the primary pathway by the conventional data switch. If data transmission errors occur, such as may happen during adverse weather conditions, the conventional data switch merely detects that data is not flowing properly to the primary pathway. The response of the conventional data switch is to shut down the primary pathway and switch all data to the secondary pathway regardless of priority and regardless of available data bandwidth.

In contrast, the data switching logic 184 will route data flows to both the primary pathway 124 and the secondary pathway 126. Under normal operating conditions, the data switching logic 184 routes all data, regardless of priority, to the primary pathway 124 via the microwave radio system 136.

In an alternative embodiment, the data switching logic 184 may route a portion of data to the secondary pathway 126 even under normal operating conditions. For example, the system 100 may determine that the traffic load on the primary pathway 124 is heavy while traffic on the secondary pathway 126 is relatively light. The system 100 may achieve a form of load balancing by transferring some of the data load from the primary pathway 124 to the secondary pathway 126 even when adverse weather is not affecting the primary pathway 124.

In adverse weather conditions, the microwave radio system 136 determines that the primary pathway 124 is not capable of handling the normal data bandwidth. The microwave radio system 136 informs the data switch 132, via the control link 138, that a limited data bandwidth is available using the primary pathway 124. The data switching logic 184 apportions data from the queues 182 to the primary pathway 124 and to the secondary pathway 126.

In addition to data bandwidth information provided to the data switch 132 on the control link 138, the microwave radio system 136 provides queuing instructions used by the data queuing logic 180 and the data switching logic 184. In response to control information on the control link 138, the data switching logic 184 will route the data from the various data queues 182 in accordance with instructions from the microwave radio system 136. For example, the available bandwidth on the primary pathway 124 may be sufficient to carry the high priority data from Queue 8. However, based on other factors, such as the RSSI and BER, the control information from the microwave radio system 136 may instruct the data switch to route this high priority data to the secondary pathway 126 regardless of the data bandwidth availability. On the other hand, the limited data bandwidth on the primary pathway 124 may support lower priority traffic, such as BE traffic. For example, web-based traffic or email traffic may be routed over the primary pathway 124 in order to maximize overall resources of the system 100.

Figure 6:
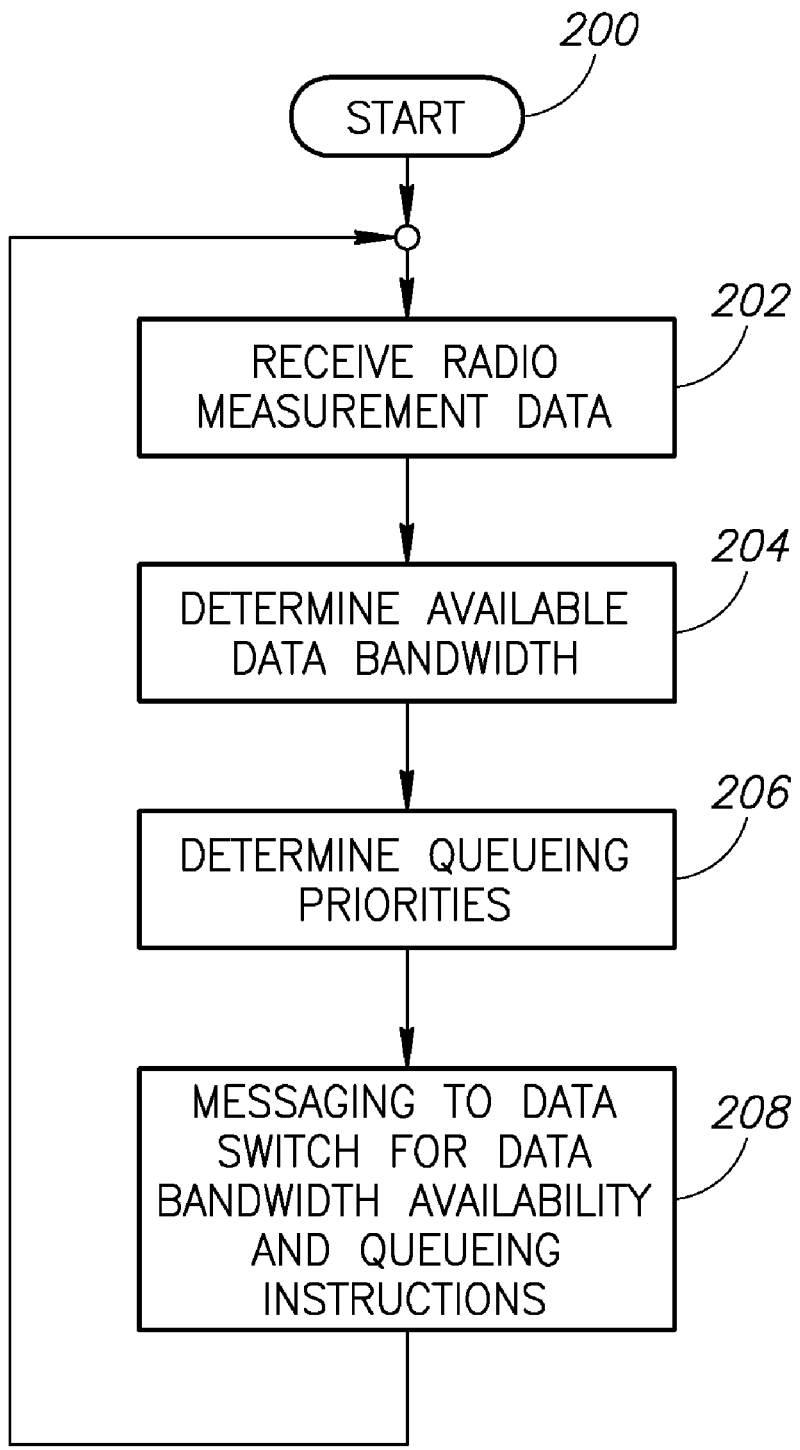
FIG. 6 is a flowchart illustrating the operation of a link evaluation process.

FIG. 6 is a flowchart illustrating the operation of the system 100 illustrated by either of the example architectures in FIGS. 1 and 2. At a start 200, the communication network is operational. At step 202, the radio link evaluation processor 158 (see FIG. 4) of the microwave radio system 136 receives radio measurement data. As discussed in detail above, the radio measurement data may include the selected modulation level, the RSSI, and the BER. These data parameters may be used to provide an indication of data bandwidth availability on the primary pathway 124 and the quality of the radio link in the primary pathway.

In step 204, the radio link evaluation processor 158 determines the available data bandwidth. As discussed above, the available data bandwidth may be determined on the basis of RF bandwidth and the selected modulation level.

In step 206, the radio link evaluation processor 158 determines the queuing priorities. This may include a determination of specific queues that will be routed on the primary pathway 124 and/or the secondary pathway 126. Alternatively, the queuing priorities may be based on a type of traffic flow. For example, the queuing priorities may determine that BE traffic may be routed on the primary pathway 124 even during adverse weather conditions with limited data bandwidth availability. Those skilled in the art will appreciate that BE traffic is often carried on multiple ones of the queues 182. Thus, queuing priorities may be designated on the basis of traffic type rather than specific queue numbers.

In step 208, the microwave radio system 136 transmits one or more messages to the switch 132 regarding data bandwidth availability and queuing instructions.

In response to the messaging from the microwave radio system 136, the data switch 132 adjusts the data flow to the primary pathway 124 on the basis of data bandwidth availability. In addition, the data switch 132 routes data on the primary pathway 124 and the secondary pathway 126. As discussed above, the response to the queuing instructions may be on the basis of uniquely identified data queues (e.g., Queue 8) or on the basis of traffic type (e.g., BE traffic). Those skilled in the art will appreciate that step 208 need not be executed if there are no changes in the operation of the microwave radio system 136. For example, if the microwave radio system 136 is operating in good weather conditions and utilizing the maximum data bandwidth, there is no need to send continuous messages to the data switch 132. This would essentially be continuously telling the data switch to keep doing what it is already doing. However, if conditions change, the microwave radio system 136 may send a message in step 208 instructing the data switch 136 to offer its operating parameters in accordance with the instructions.

Following the execution of step 208, if a message is sent at step 208, the operation returns to step 202 to again receive radio measurement data. Thus, the microwave radio system continuously receives data and performs the analysis illustrated in FIG. 6 to constantly monitor conditions in the primary pathway 126.

Figure 7:
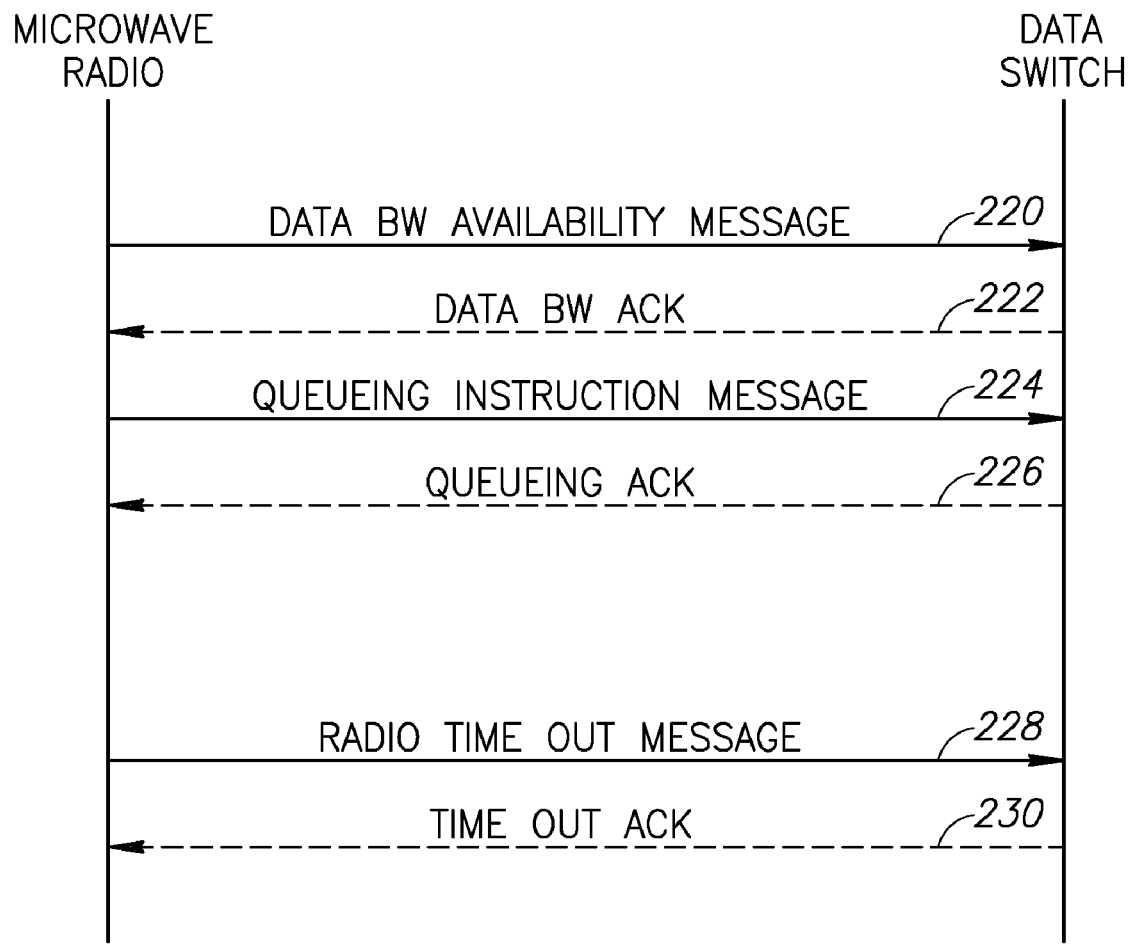
FIG. 7 illustrates messaging between the microwave radio and the switch of FIG. 3.

At present, there is no standard communication protocol for the exchange of control information between the microwave radio system 136 and the data switch 132. However, there are existing communication protocols that may be capable of modification to accomplish the communication between the microwave radio system and the data switch. For example, IEEE 802.1 defines communications standards for sharing information within a network. IEEE 802.1q defines an encapsulation protocol that is used for virtual local area network (VLAN) tagging. Such communication protocols can be extended or expanded to include data exchanges between the microwave radio system 136 and the data switch 132. FIG. 7 illustrates an example message exchange. At 220, the microwave radio system 136 transmits a bandwidth availability message to the data switch 132. The data switch 132 may respond with an optional bandwidth acknowledgement (BW_ACK) message 222. The microwave radio system 136 may send queuing instructions 224. The data switch 132 may optionally respond with a queuing acknowledgement (QUE_ACK) 226. Those skilled in the art will appreciate that a single message may be transmitted that contains both bandwidth availability and queuing instructions.

Other communication messages may also be exchanged between the microwave radio system 136 and the data switch 132. For example, the microwave radio system may periodically, at a predetermined interval, send a radio time-out message 228. The radio time-out message 228 provides positive communication between the microwave radio system 136 and the data switch 132 to show that the communication link 138 is still active. Such a message may be important at times when there are no changes in the bandwidth availability in queuing instructions. In this manner, the base station 102 can confirm proper operation of the communication link 138. The data switch 132 may respond to the radio time-out message 228 with a time-out acknowledgement message 230. Other forms of housekeeping messages may also be exchanged between the microwave radio system 136 and the data switch 132.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communication system comprising:
    a base station having a transmitter and receiver configured to communicate with user equipment (UE);
    a microwave radio system coupled to the base station to form a first wireless communication pathway, the microwave radio system being configured to generate data indicative of an available bandwidth on the first wireless communication pathway;
    a second communication pathway;
    a switch coupled to the microwave radio system by a control link and configured to route data for transmission over the first and second pathways; and
    a processor communicatively coupled to the microwave radio system and configured to evaluate the first communication pathway based on the generated data and to determine a quality parameter of the first communication pathway, the processor communicating with the switch regarding the quality parameter of the first communication pathway to permit the switch to control the data being routed for transmission over the first communication pathway wherein the switch is configured to direct a portion of the data intended for transmission over the first communication pathway to the second communication pathway and thereby reduce, but not eliminate, the amount of data being routed for transmission over the first communication pathway based on the quality parameter received from the microwave radio.

2. The system of claim 1 wherein the switch is configured to direct at least a portion of the data intended for transmission over the first communication pathway to the second communication pathway to reduce the amount of data being routed for transmission over the first communication pathway based at least in part on the communication from the processor communicating regarding the quality parameter of the first communication pathway.

3. The system of claim 1 wherein the switch is configured to direct at least a portion of the data intended for transmission over the first communication pathway to the second communication pathway to reduce the amount of data being routed for transmission over the first communication pathway based at least in part on an available bandwidth of the first communication pathway.

4. The system of claim 1 wherein the switch is configured to direct at least a portion of the data intended for transmission over the first communication pathway to the second communication pathway to reduce the amount of data being routed for transmission over the first communication pathway based at least in part on a priority level of the data intended for transmission over the first communication pathway.

5. The system of claim 1 wherein the processor is part of the microwave radio.

6. The system of claim 1 wherein the processor is part of the microwave radio.

7. The system of claim 1 quality parameter is a modulation type used by the microwave radio.

8. The system of claim 1 quality parameter is an error rate over the first communication pathway.

9. The system of claim 1 quality parameter is a signal strength of signals communicated on the first communication pathway.

10. The system of claim 1 quality parameter is at least one quality measure selected from a group of quality parameters comprising a modulation type used by the microwave radio, an error rate over the first communication pathway, and a signal strength of signals communicated on the first communication pathway.

11. The system of claim 1 wherein the processor communicates with the switch to inform the switch of an available bandwidth on the first communication pathway.

12. The system of claim 11 wherein the switch control a quantity of data being routed for transmission over the first communication pathway based on the available bandwidth on the first communication pathway.

13. The system of claim 1 wherein the processor communicates with the switch using a message to inform the switch of an available bandwidth on the first communication pathway.

14. The system of claim 1, further comprising a queue storage for a plurality of queues containing data received by the switch and placed by the switch in one of the queues based on a priority level associated with the data.

15. The system of claim 14 wherein the switch adjusts the portion of the data routed for transmission over the first communication pathway based at least in part on a queuing priority associated with the plurality of queues.

16. The system of claim 15 wherein the queuing priority is based at least in part on the quality parameter received from the microwave radio.

17. A communication system for communication between a transmitting network element and a receiving network element, comprising:
- a microwave radio operatively coupled to the transmitting network element to form a first wireless communication pathway with the receiving network element, the microwave radio system being configured to generate data indicative of an available bandwidth on the first wireless communication pathway;
- a second communication pathway;
- a switch coupled to the microwave radio system by a control link and configured to route data for transmission over the first and second pathways; and
- a processor communicatively coupled to the microwave radio system and configured to evaluate the first communication pathway based on the generated data and to determine a quality parameter of the first communication pathway, the processor communicating with the switch regarding the quality parameter of the first communication pathway to permit the switch to control the data being routed for transmission over the first communication pathway wherein the switch is configured to direct a portion of the data intended for transmission over the first communication pathway to the second communication pathway and thereby reduce, but not eliminate, the amount of data being routed for transmission over the first communication pathway.

18. The system of claim 17 wherein the switch is configured to direct at least a portion of the data intended for transmission over the first communication pathway to the second communication pathway to reduce the amount of data being routed for transmission over the first communication pathway based at least in part on the communication from the processor communicating regarding the quality parameter of the first communication pathway.

19. The system of claim 17 wherein the switch is configured to direct at least a portion of the data intended for transmission over the first communication pathway to the second communication pathway to reduce the amount of data being routed for transmission over the first communication pathway based at least in part on an available bandwidth of the first communication pathway.

20. The system of claim 17 wherein the switch is configured to direct at least a portion of the data intended for transmission over the first communication pathway to the second communication pathway to reduce the amount of data being routed for transmission over the first communication pathway based at least in part on a priority level of the data intended for transmission over the first communication pathway.

21. The system of claim 17 wherein the transmitting network element is a base station in a wireless communication network.

22. The system of claim 17 wherein the receiving network element is a second base station in the wireless communication network.

23. The system of claim 17 wherein the receiving network element is a mobile switching center in the wireless communication network.

24. A data switch in a communication network comprising:
- a data input configured to receive data;
- a first output configured to transmit a portion of the data received at the input along a first communication pathway;
- a second output configured to transmit a portion of the data received at the input, which is not transmitted at the first output, along a second communication pathway;
- a control input configured to receive data representative of a quality parameter of the first communication pathway; and
- a control processor communicatively coupled to the control input and generating control signals to control the portion of the data to the first output based at least in part on the received quality parameter to switch a portion of the data to the second output for transmission along the second communication pathway to thereby reduce, but not eliminate, the portion of the data to the first output if the quality parameter indicates adverse conditions in the first communication pathway.

25. The switch of claim 24 wherein the first communication pathway comprises a wireless communication link and the quality parameter used by the control processor is based on parameters associated with the wireless communication link.

26. The switch of claim 25 wherein the wireless communication link comprises a microwave communication link and the quality parameter used by the control processor is based on parameters associated with the microwave link.

27. The switch of claim 24 wherein the quality parameter is at least one quality measure selected from a group of quality parameters comprising a modulation type used by the wireless communication link, an error rate over the first communication pathway, and a signal strength of signals communicated on the first communication pathway.

28. The switch of claim 24 wherein the quality parameter is indicative of an available bandwidth on the first communication pathway and the control processor adjusts the portion of the data to the first output based at least in part on the available bandwidth.

29. The switch of claim 24, further comprising a queue storage for a plurality of queues containing data received from the input and placed in one of the queues based on a priority level associated with the data.

30. The switch of claim 29 wherein the control processor adjusts the portion of the data to the first output based at least in part on a queuing priority associated with the plurality of queues.

* * * * *